(No Model.)
C. D. EDWARDS.
CLOD CUTTER.
No. 306,728. Patented Oct. 21, 1884.
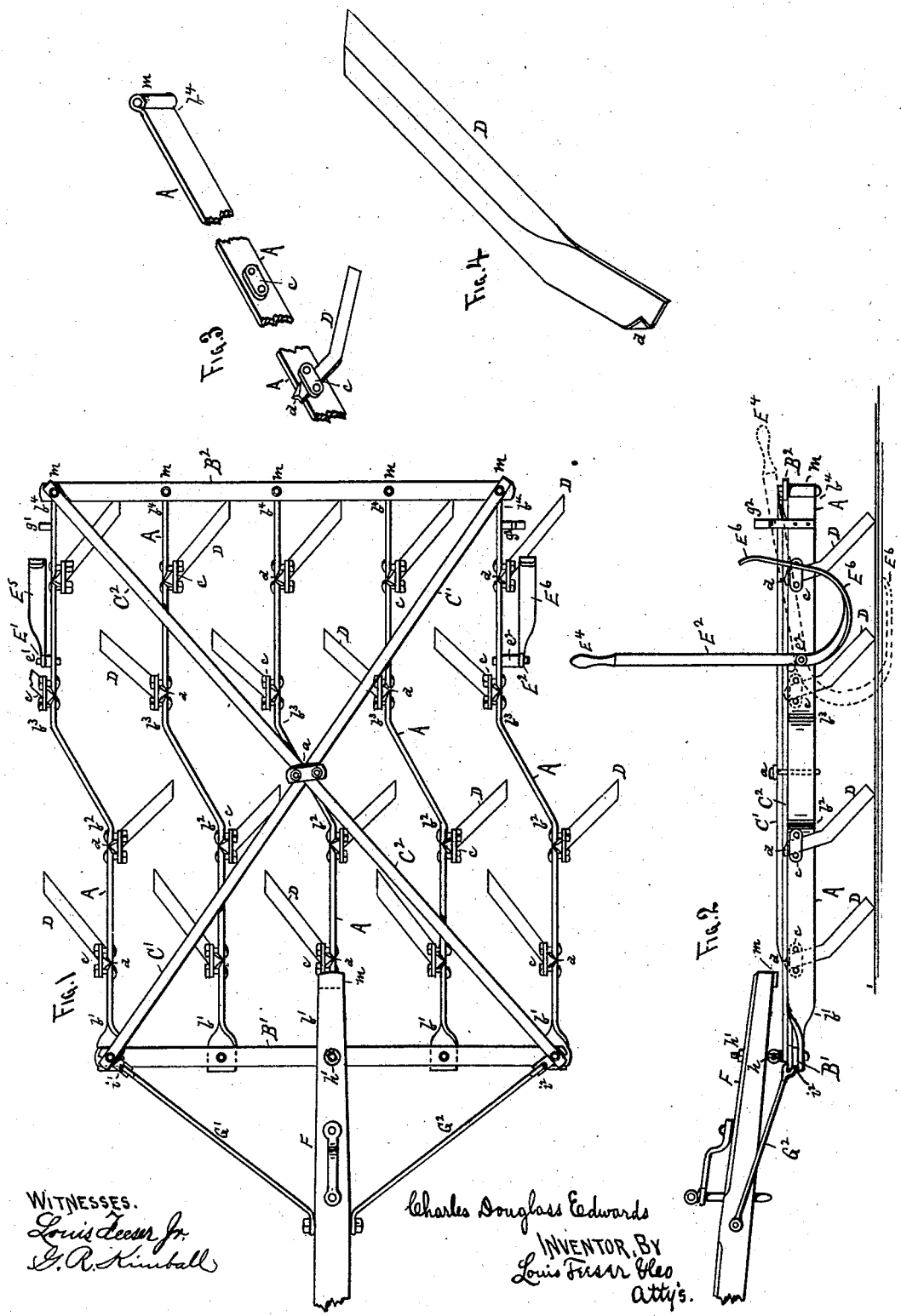
Witnesses.
Louis Feeser Jr.
G. R. Kimball
Charles Douglass Edwards
INVENTOR, BY
Louis Feeser & Leo
Atty's.

UNITED STATES PATENT OFFICE.

CHARLES DOUGLASS EDWARDS, OF ALBERT LEA, MINNESOTA.

CLOD-CUTTER.

SPECIFICATION forming part of Letters Patent No. 306,728, dated October 21, 1884.

Application filed January 11, 1884. (No model.)

*To all whom it may concern:*

Be it known that I, CHARLES DOUGLASS EDWARDS, a citizen of the United States, and a resident of Albert Lea, in the county of Freeborn, in the State of Minnesota, have invented certain new and useful Improvements in Clod-Cutters, of which the following specification is a full, clear, and exact description, reference being also had to the accompanying drawings, in which—

Figure 1 is a plan view, and Fig. 2 is a side elevation. Fig. 3 is a perspective view of sections of one of the tooth-bars detached. Fig. 4 is an enlarged perspective view of one of the teeth detached.

A A are the tooth-bars, connected at their ends by front and back bars, B' B$^2$, and the outer tooth-bars and the ends of the front and back bars connected by cross-braces C' C$^2$, as shown. These braces, where they cross each other, are clamped to each other and also the center of the central tooth-bar, A, by a clip, $a$, all the parts being thus firmly secured together. The tooth-bars A are formed with their front portions, from $b'$ to $b^2$, straight and parallel with each other, while their rear portions, from $b^3$ to $b^4$, are also straight and parallel with each other; but each straight section of each bar is connected by an angular part from $b^2$ to $b^3$, so that the straight sections $b^3$ to $b^4$ are opposite the centers of the spaces between the straight sections from $b'$ to $b^2$, as shown in Fig. 1. The forward ends of the tooth-bars A are twisted around one-half a turn, and bolted or riveted beneath the forward bar, B', while their rear ends are simply bent around into eyes, as shown at $m$ in Figs. 2 and 3, through which to pass the bolts or rivets by which they are secured beneath the rear bars, B$^2$. Upon opposite sides of each of the straight sections of the tooth-bars small plates or clips, $c$, are riveted, bolted, or otherwise secured, adapted to clamp between them and the tooth-bars the upper ends of the teeth D. The teeth are attached to the bent tooth-bars only on their parallel front and rear portions, and a tooth is placed on each side of each portion, so that since these portions are all parallel with the line of motion, and the resistance of the teeth is equal on each side of each portion, there is no tendency to cant the tooth-bars, as shown. These teeth are bent off at an angle to the tooth-bars in opposite directions, the first and third rows being bent to the left, and the second and fourth rows being bent to the right when looked at from the front. The teeth are made long enough, so that when thus bent off sidewise their lower points will cross or lap over each other, to cause the teeth to cut more closely and thoroughly through the sod or turf, and thus detach all the pieces between the knives. This bending of the tooth-bars enables me to set the cutting-points of the teeth on the rear straight sections, $b^3 b^4$, opposite the centers of the spaces between the cutting-points of the forward straight sections, $b' b^2$, thereby causing the teeth to cut uniformly and with small equal-sized spaces between their furrows. One of the upper corners, $d$, or the whole upper end of each of the teeth D, will be bent over slightly, as shown, to rest upon the top edge of the bars A or clips $c$, to form stops to prevent the teeth from slipping down through the clips, and also to assist in holding the teeth at any desired angle.

Pivoted at $e' e^2$ to the rear parts of the two outer bars, A, are two bent levers, E' E$^2$, their upper parts formed into handles E$^4$, and their lower parts bent around into flat and curved "shoes" E$^5$ E$^6$. These levers are so formed that when the handles E$^3$ E$^4$ are turned upright, as shown in full lines in Fig. 2, the shoes will be held up above the lower line of the teeth D; but when the levers are turned down, as shown by dotted lines in Fig. 2, the shoes will come below the lower line of the teeth; hence the frame A B' B$^2$ C' C$^2$ and teeth D will be elevated and held up above the ground, and caused to drag along upon the shoes similar to a sled. By this simple means the "cutter" may be raised up out of the ground and moved along to any distance when it is desired to transport it from place to place. Small catches $g' g^2$ will be arranged upon the rear ends of the outer bars, A, to catch the levers E' E$^2$, when they are depressed, to hold them in that position.

F is the tongue by which the cutter is drawn forward, which is attached at its rear end by a flexible connection, $h$, to the central bar, A, and is provided with side brace-rods, G' G$^2$, by which it is connected to the forward corners of the cutter by clips $i' i^2$. These brace-rods are jointed or hinged to the clips $i'$ $i^2$, and pivoted to the sides of the tongue, so that while holding the latter from all side-play, it leaves it free to be moved up and down to a limited extent, the flexible joint $h$ also aiding in this up-and-down movement. By this means the cutter will rise and fall with the varying surface of the ground without affecting the tongue. The flexible attachment of the tongue also enables the cutter to be raised from the ground by the levers $E'$ $E^2$ without affecting the tongue. The upper section of the flexible connection $h$ is provided with a nut, $h'$, whereby the tongue may be adjusted higher and lower with relation to the bars A. Underneath the rear end of the tongue is secured a small metal plate, $m$, adapted to strike and rest upon the upper side of the center bar, A, when the forward end of the tongue is raised, to receive the wear and prevent its coming upon the tongue.

Having described my invention and set forth its merits, what I claim is—

1. In a sod-cutter, the combination of a series of tooth-bars, A A, placed parallel with one another, each having a forward and a back part parallel with the line of draft, each of the said portions carrying two oppositely-bent teeth, D D, and connected by an oblique offset portion, bringing the back parts of all the tooth-bars equidistant between the lines of the several forward parts, for the purpose specified.

2. A sod-cutter constructed with parallel tooth-bars A A, having forward and back parts parallel with the line of draft, carrying teeth bent in opposite directions and connected by oblique offset parts, forward and rear cross-bars, $B'$ $B^2$, bolted to the tooth-bars, and diagonal braces $C'$ $C^2$, connecting opposite corners of the sod-cutter, and clipped at their crossing to the middle tooth-bar, for the purpose specified.

In testimony whereof I have hereunto set my hand in presence of two subscribing witnesses.

CHARLES DOUGLASS EDWARDS.

Witnesses:
 L. E. DUNN,
 L. J. THOMAS.